United States Patent
Chawla et al.

(10) Patent No.: US 11,451,598 B1
(45) Date of Patent: Sep. 20, 2022

(54) SYSTEMS AND METHODS FOR DIGITAL MEDIA STORAGE

(71) Applicant: Meta Platforms, Inc., Menlo Park, CA (US)

(72) Inventors: Ashish Chawla, Redmond, WA (US); William Robert Crew, Redwood City, CA (US); Trev Poulson, Seattle, WA (US); Trent Richard Walkiewicz, Seattle, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 105 days.

(21) Appl. No.: 16/921,771

(22) Filed: Jul. 6, 2020

(51) Int. Cl.
| | |
|---|---|
| *H04L 65/60* | (2022.01) |
| *G06F 3/0482* | (2013.01) |
| *G06F 3/04817* | (2022.01) |
| *G06F 16/735* | (2019.01) |
| *G06N 5/04* | (2006.01) |
| *G06N 20/00* | (2019.01) |
| *G06F 16/74* | (2019.01) |
| *H04N 21/466* | (2011.01) |
| *H04N 21/482* | (2011.01) |

(52) U.S. Cl.
CPC ............ *H04L 65/60* (2013.01); *G06F 3/0482* (2013.01); *G06F 3/04817* (2013.01); *G06F 16/735* (2019.01); *G06F 16/74* (2019.01); *G06N 5/04* (2013.01); *G06N 20/00* (2019.01); *H04N 21/4668* (2013.01); *H04N 21/4826* (2013.01)

(58) Field of Classification Search
CPC ....... H04L 65/60; G06F 16/74; G06F 16/735; G06F 3/04817; G06F 3/0482; G06N 20/00; G06N 5/04
USPC ......................................................... 715/716
See application file for complete search history.

(56) References Cited

U.S. PATENT DOCUMENTS

| | | | |
|---|---|---|---|
| 10,057,204 B2 * | 8/2018 | Miller ..................... | H04L 51/36 |
| 2014/0053180 A1 * | 2/2014 | Shoykher ......... | H04N 21/25808 725/14 |
| 2014/0053205 A1 * | 2/2014 | Sirpal .............. | H04N 21/25808 725/49 |
| 2017/0060776 A1 * | 3/2017 | Shimonek ............. | H04L 9/0816 |
| 2017/0068423 A1 * | 3/2017 | Napolitano ............. | G06F 40/40 |
| 2018/0039698 A1 * | 2/2018 | Lewis ..................... | G06F 16/74 |
| 2019/0034048 A1 * | 1/2019 | Gibbons ............... | G06F 3/0482 |
| 2019/0079662 A1 * | 3/2019 | Wan ..................... | G06F 3/04847 |
| 2019/0182561 A1 * | 6/2019 | Garmark ................. | H04L 65/60 |
| 2020/0074738 A1 * | 3/2020 | Hare ....................... | H04L 51/10 |
| 2020/0077151 A1 * | 3/2020 | Swerdlow .......... | H04N 21/4312 |
| 2020/0153676 A1 * | 5/2020 | Bradbury ............. | H04N 21/858 |

(Continued)

*Primary Examiner* — William D Titcomb
(74) *Attorney, Agent, or Firm* — FisherBroyles, LLP (57) ABSTRACT

Systems and methods for creating automatic digital representations of events may include (1) transmitting a preview segment of a recommended media item to a user's device for presentation within a media consumption interface presented within a display element of the device, (2) receiving, from the device, an indication that the user has selected a user-selectable save element presented in association with the preview segment within the media consumption interface, and (3) in response to receiving the indication, adding a full-length version of the recommended media item to a digital container maintained for the user. Various other methods, systems, and computer-readable media are also disclosed.

20 Claims, 7 Drawing Sheets

(56) References Cited

U.S. PATENT DOCUMENTS

2020/0301567 A1* 9/2020 Park .................. G06F 9/451
2020/0356590 A1* 11/2020 Clarke ............... G06F 16/435

* cited by examiner

SYSTEMS AND METHODS FOR DIGITAL MEDIA STORAGE

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The digital nature of modern media services provides users with a vastness of choice. The time required for users to discover and collect media within such vastness may far exceed the time limitations of most users, prohibiting digital media services from adequately providing users with media that meets their needs and preferences. Responding to this, the present disclosure identifies a need for improved systems and methods for (1) selecting and presenting short, relevant media segments, (2) digitally gauging user interest in the segments, and (3) providing full-length versions of the media items for immediate viewing or later viewing based on the digitally gauged interest.

The present disclosure may provide a media retrieval and organization (e.g., storage) system that enables media discovery within a designated time constraint. In some examples, the system may (1) identify one or more recommended media items to present to a user via a user device (e.g., based on a recency metric and/or determined user preference), (2) select and transmit (e.g., stream) a preview segment of each identified media item to the user device, (3) enable the user to digitally respond to the preview segments (e.g., by accepting or skipping the preview segments being streamed), and (4) enable deferred consumption of full-length versions of the accepted preview segments.

In one embodiment, the disclosed systems and methods may be used in a digital music video system (e.g., as part of a digital music service that provides users with music videos). In one such example, the digital music video system may provide a user with a digest interface that presents a digest of recommended music videos (e.g., a weekly "New Releases" digest updated each week to highlight music videos released during the week). The digest interface may be configured to stream preview portions of music videos included within the digest (e.g., by auto-advancing between each preview portion). After the user is presented with a preview portion, the digest interface may enable the user to add a corresponding music video to one or more lists maintained by the music video system for the user, such as a watch list and/or a media station (e.g., a playlist).

In some embodiments, the disclosed systems may include and/or rely on a machine learning system for selecting recommended media items and/or preview segments of recommended media items. The machine learning system may select the recommended media items and/or preview segments based on a variety of inputs, such as user history (e.g., how much time a user spends watching media items, a type or genre of media item consumed by the user, artists the user follows, etc.) and/or the user's digital response to other media items (e.g., media items skipped, watched, and/or saved for later via the disclosed media platform).

As will be explained in greater detail below, embodiments of the present disclosure may improve systems for automatically selecting recommended media content and providing full-length versions of selected content for immediate or delayed consumption. The present disclosure may improve the functioning of a computer itself by improving data selection and organization (e.g., storage) performed by computers. This may also improve the field of heuristic-based media content selection by improving a classifier trained to identify content predicted to be of interest to a user.

Figure 1:
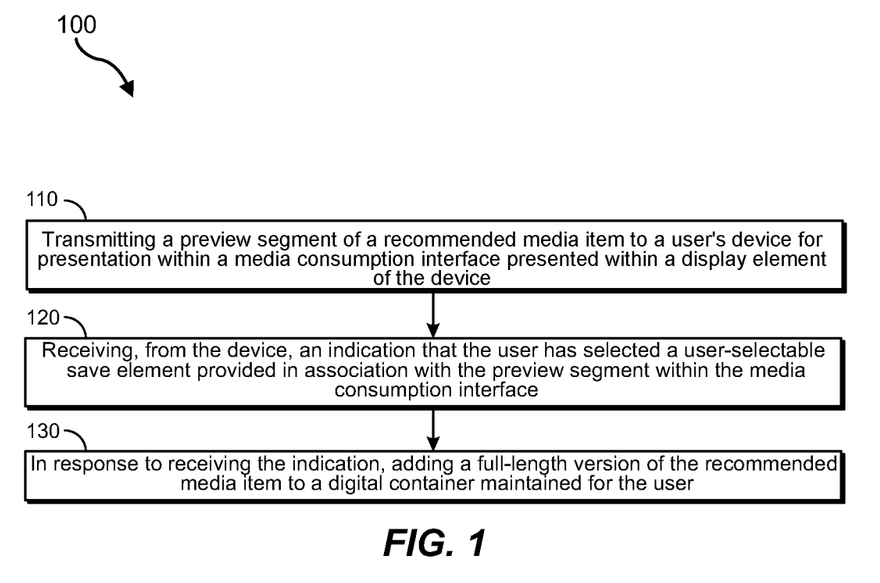
FIG. 1 is a flow diagram of an exemplary method for transmitting and storing digital media content.

The following will provide, with reference to FIG. 1, detailed descriptions of computer-implemented methods for transmitting and storing digital media content. Detailed descriptions of corresponding example systems will also be provided in connection with FIG. 2. Detailed descriptions of corresponding exemplary user interfaces in which the disclosed systems and methods may be implemented will be provided in connection with FIGS. 3-7.

FIG. 1 is a flow diagram of an exemplary computer-implemented method 100 for transmitting and storing digital media content. The steps shown in FIG. 1 may be performed by any suitable computer-executable code and/or computing system, such as the systems described herein. In one embodiment, the steps shown in FIG. 1 may be performed by modules operating within a computing device. For example, the steps shown in FIG. 1 may be performed by modules operating in a server 202 (e.g., as shown in exemplary system 200 in FIG. 2) and/or modules operating in a user device 204.

Figure 2:
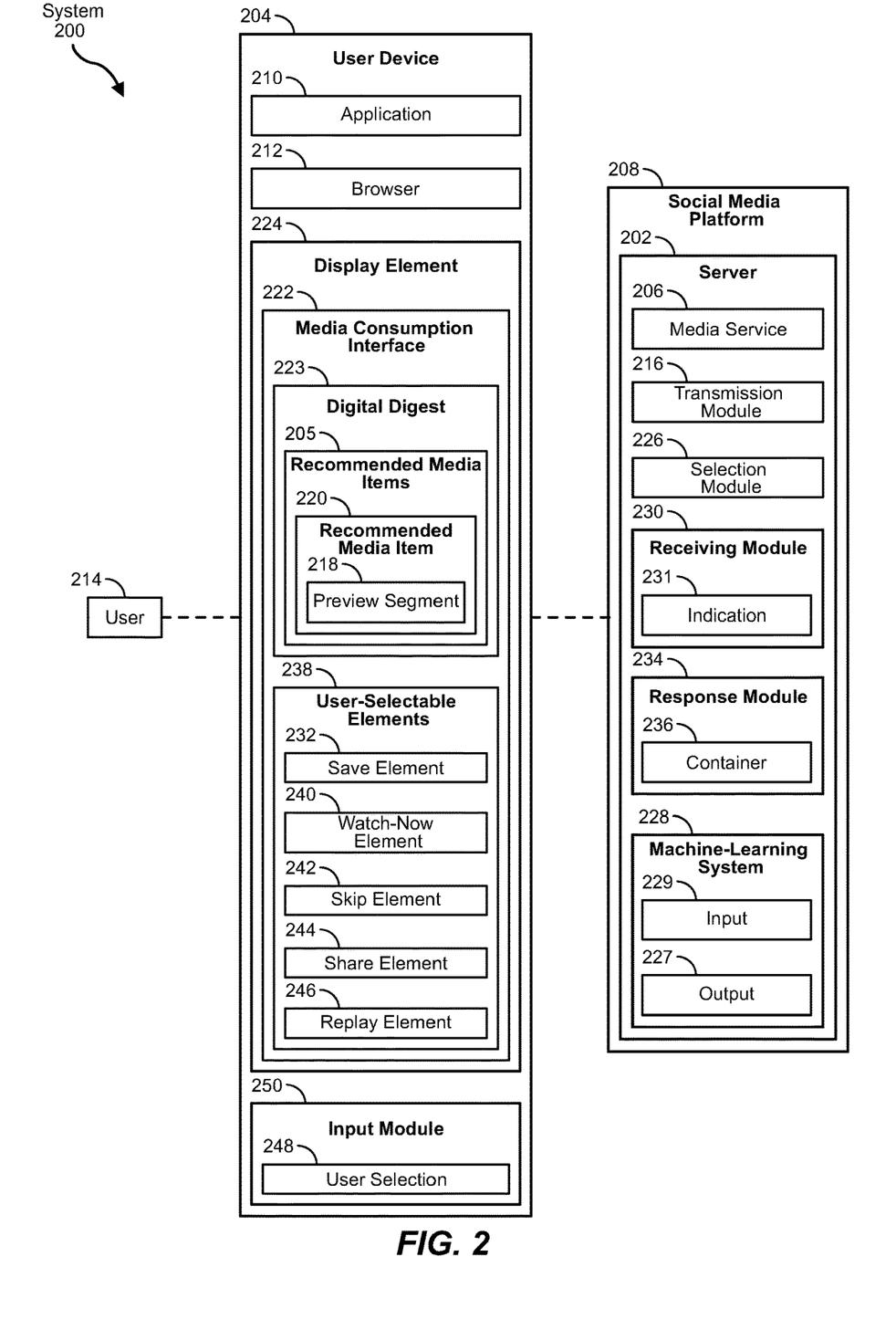
FIG. 2 is a block diagram of an exemplary system for transmitting and storing digital media content.
Figure 3:
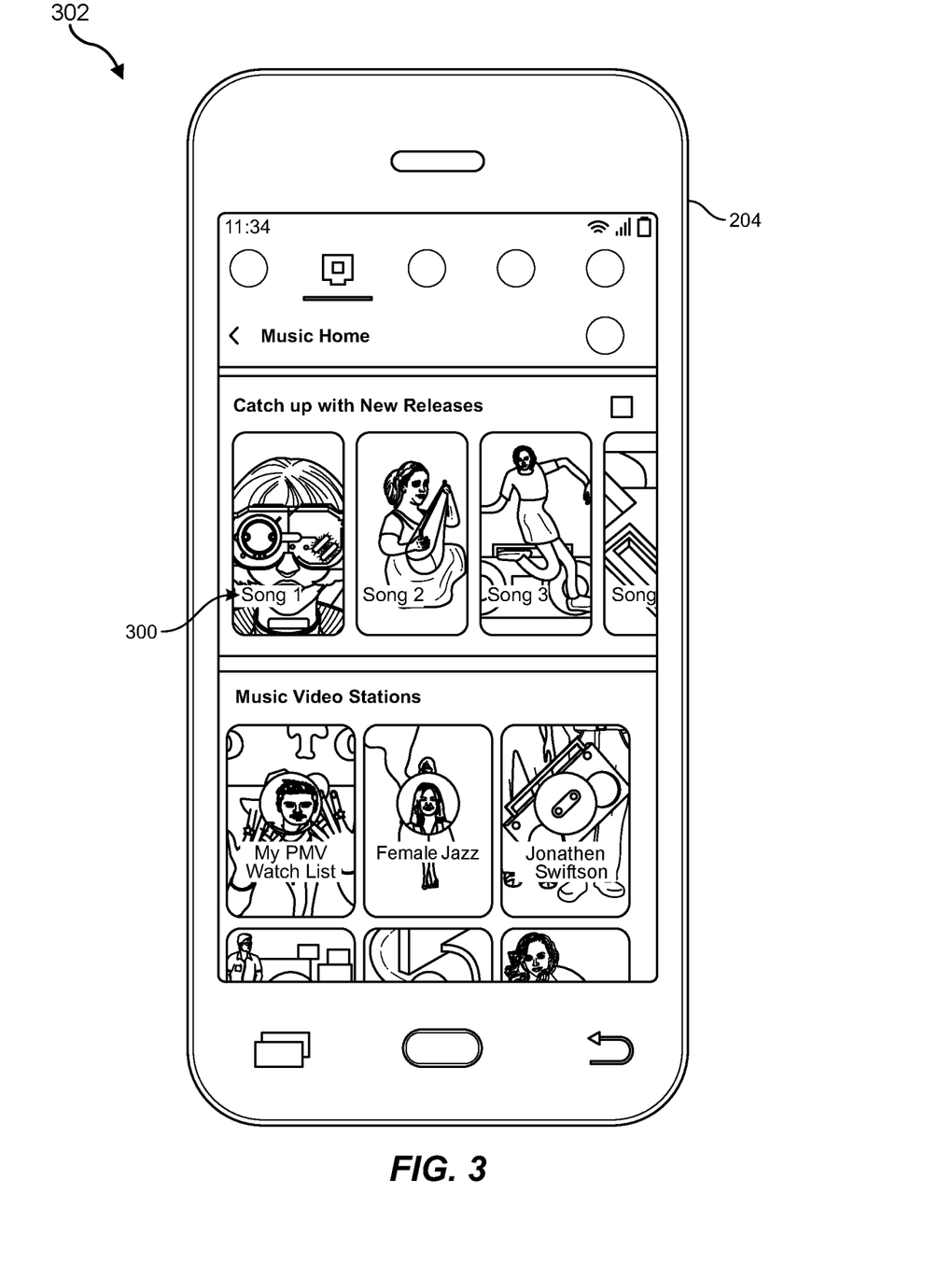
FIG. 3 is an illustration of an exemplary media home screen interface.

Server 202 generally represents any type or form of backend computing device that digitally provides a media service 206 to end users. Server 202 may perform a variety of functions, such as media streaming, generating and providing media recommendations, selecting preview segments of media recommendations, generating and/or storing playlists, etc. In one embodiment, as will be described in greater detail below, server 202 may generate and stream preview segments of recommended media items 205 and store, in user-accessible containers (e.g., media stations), full-length versions of streams selected via user input.

In some examples, server 202 may provide media service 206 in conjunction with a multi-service platform, such as a social media platform 208 that manages server 202. Alternatively, server 202 may provide services in conjunction with a standalone media service (e.g., in conjunction with a single-service product). Although illustrated as a single entity in FIG. 2, server 202 may include and/or represent a group of multiple servers that operate in conjunction with one another.

User device 204 generally represents any type or form of computing device capable of reading computer-executable instructions. For example, user device 204 may represent a smart phone and/or a tablet. Additional examples of user device 204 may include, without limitation, a laptop, a desktop, a wearable device, a personal digital assistant (PDA), etc. In some examples, user device 204 may be configured to receive one or more functionalities of media service 206 from server 202 (e.g., via an application 210 and/or a browser 212 installed on user device 204).

Media service 206 generally represents any type or form of digital service that provides users (such as a user 214 of user device 204) with digital access to media, enabling users to discover, consume, store, organize, and/or digitally share media. In one example, media service 206 may provide access to a particular media item in response to a direct user request for the particular media item (e.g., by streaming the requested media item and/or making the requested music composition available for sharing and/or saving). In another example, media service 206 may provide and/or maintain one or more media stations and/or playlists for users.

In some embodiments, media service 206 may provide users with recommended media content (e.g., within a digest of recommended media). Media service 206 may generate and provide recommended media content in response to a variety of triggers (e.g., in accordance with a media-recommendation policy). For example, media service 206 may be configured to create a themed digest of recommended media based on a calendar event. As a specific example, media service 206 may be configured to create to create a Mother's Days digest on Mother's Day. As another example, media service 206 may be configured to create a periodic digest on a period basis. For example, media service 206 may be configured to create a "Daily Digest of New Release Music Videos" once daily, as will be described in greater detail below in connection with steps 110-130.

In examples in which server 202 provides media service 206 in conjunction with social media platform 208, user 214 may be a member of social media platform 208 and user device 204 may have installed an instance of a social media application that operates as part of social media platform 208 (such as application 210). In these examples, social media platform 208 may provide a variety of additional services for the users within its network (in addition to providing media service 206).

For example, social media platform 208 may provide a digital story service. The digital story service may provide users with a story consumption channel, which presents a continuous series of digital story compositions to a story consumer, one by one. In one example, the story consumption channel may transition from presenting one digital story composition to the next automatically, without requiring any user input to do so. In some examples, a digital story composition may be ephemeral (e.g., viewable only for a predetermined amount of time). For example, a digital story composition may be set to disappear after twenty-four hours. A digital story stream may include a variety of content (e.g., a digital photograph, a graphic, text, a digital video, and/or a digital recording of a music composition). In some examples, each digital story composition from the same story-source (e.g., created and/or posted by a same user) may be grouped together within the story consumption channel to form a digital story, and each digital story composition within a particular digital story may be displayed prior to the display of digital story compositions from another digital story.

As another example, social media platform 208 may provide a newsfeed service. The term "newsfeed" may generally refer to any type or form of social media consumption channel that presents a scrollable collection of newsfeed compositions. In some examples, a newsfeed may scroll (e.g., upward or downward) to reveal different compositions within the newsfeed, in response to receiving user scrolling input. In one example, the scrollable collection may include a collection of newsfeed compositions created by contacts of a particular user (e.g., friends of the particular user). The term "newsfeed composition" as used herein generally refers to any type or form of composition that may be displayed in a newsfeed. Newsfeed compositions may include, without limitation, text-based compositions, media-based compositions (which may include either a single media item or a collage of multiple media items), and/or a link to an online article.

As another example, social media platform 208 may provide a messaging service. The term "messaging service" may generally refer to any type or form of digital message delivery system that enables users of social media platform 208 to exchange messages (e.g., private messages between two or more users). These messages may include a variety of content (e.g., text, a link, a live video, a voice recording, etc.) and may take a variety of forms (e.g., e-mail, text message, group chat, etc.).

Returning to FIG. 1, at step 110, one or more of the systems described herein may transmit a preview segment of a recommended digital media item to a user's device for presentation within a media consumption interface presented within a display element of the device. For example, as illustrated in FIG. 2, a transmission module 216 may transmit a preview segment 218 of a recommended media item 220 to user device 204 for presentation within a media consumption interface 222 presented within a display element 224 of user device 204.

Recommended media item 220 may generally represent any type or form of streamable and/or downloadable recommended content. The term "recommended content" may refer to digital media content that is recommended by a platform and/or a service, such as social media platform 208 and/or media service 206. Examples of recommended media item 220 include, without limitation, (1) a digital video (e.g., a digital music video, a film, and/or a video recording of a live event such as a lecture) and/or (2) a digital audio recording (e.g., a podcast, a musical work, and/or an audiobook).

The term "preview segment" may refer to any type or form of streamable and/or downloadable digital media item extracted from a longer (e.g., full-length) digital media item as an excerpt of the longer digital media item. As a specific example, recommended media item 220 may represent a media item that is three minutes in length, and preview segment 218 may represent an excerpt of recommended media item 220, taken from the three minutes, that is only one minute in length.

Figure 4:
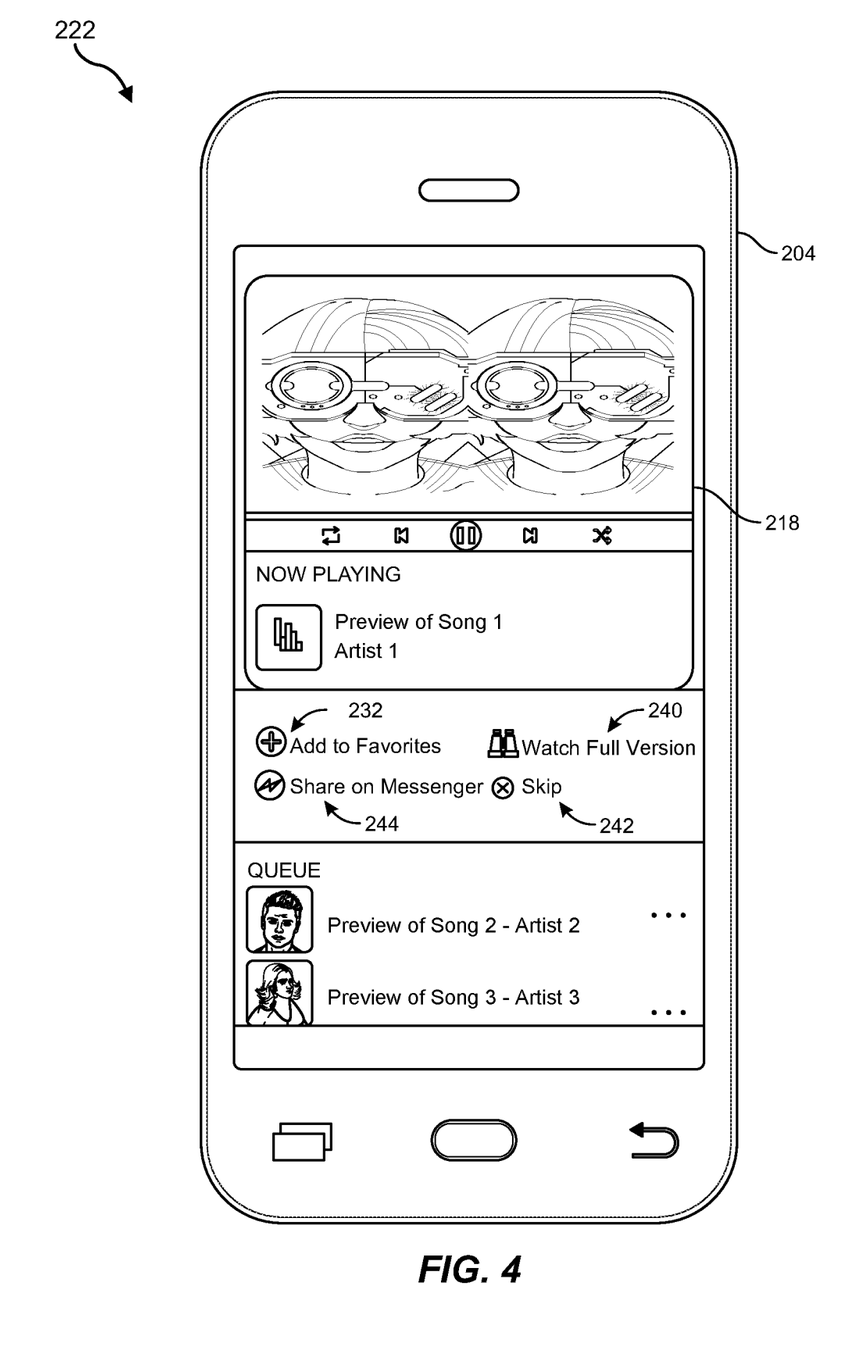
FIG. 4 is an illustration of an exemplary media consumption interface for streaming and digitally responding to digital media content.

Media consumption interface 222 may generally represent any type or form of user interface that enables media consumption. The term "user interface" may refer to any type or form of graphical and/or multimedia user interface capable of (1) receiving user input (e.g., via a touchscreen and/or an auxiliary device such as a digital mouse and/or keyboard) and (2) displaying visual content and/or providing auditory content. FIG. 4 represents an exemplary illustration of media consumption interface 222 according to one embodiment. An additional embodiment of media consumption interface 222 is provided in FIG. 6.

Figure 5:
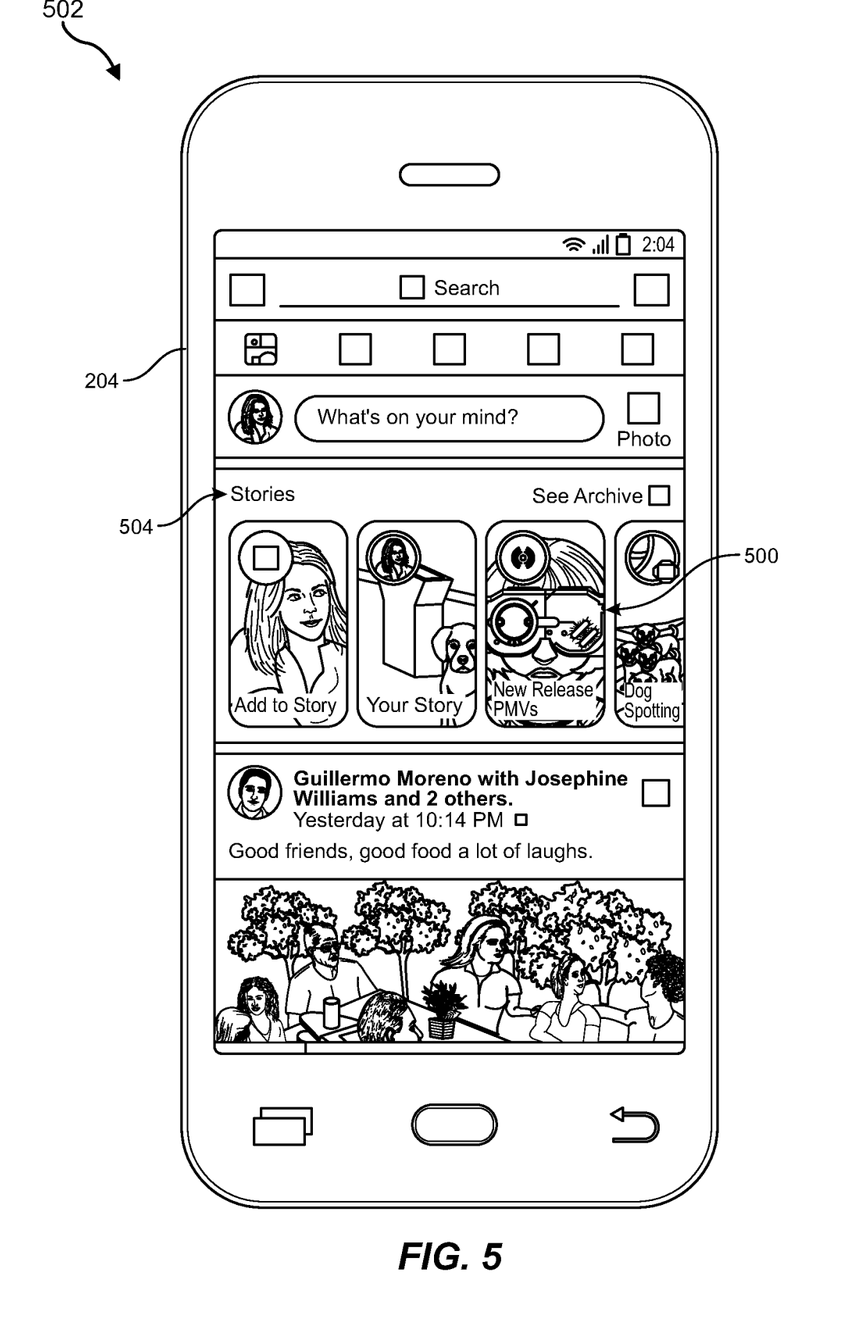
FIG. 5 is an illustration of an exemplary social media interface in which automatically generated preview streams are provided within a selectable digital story.
Figure 6:
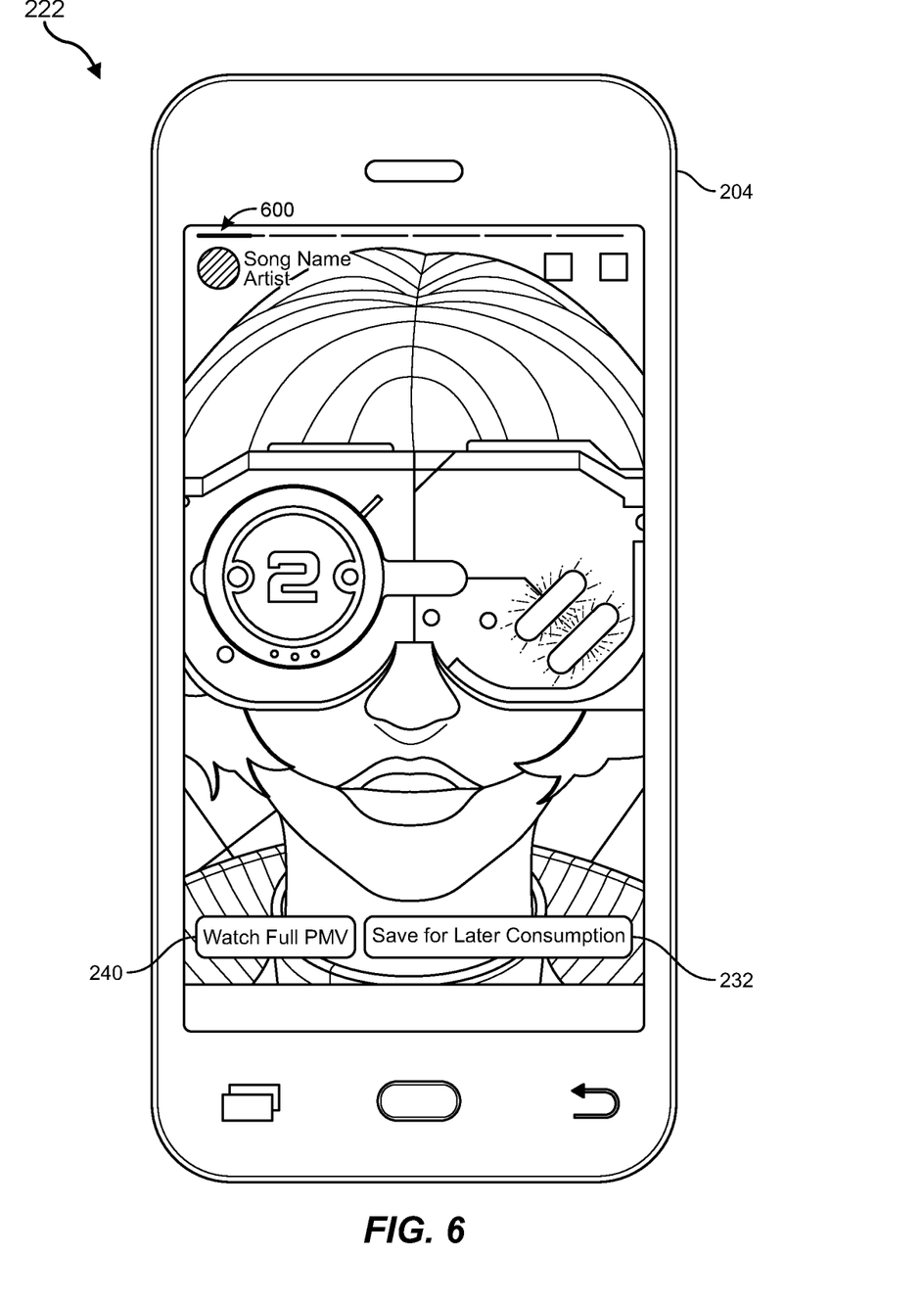
FIG. 6 is an illustration of an exemplary digital story post, included within a digital story depicted in FIG. 5.

In some examples, media consumption interface 222 may represent one interface within a consumption flow that includes multiple interfaces. In some such examples, media consumption interface 222 may be presented in response to receiving user input to a previous user interface within the consumption flow. For example, media consumption interface 222 as illustrated in FIG. 4 may be presented in response to receiving user input selecting a selectable tile element 300 provided within a home screen 302 illustrated in FIG. 3. As another example, media consumption interface 222 as illustrated in FIG. 6 may be presented in response to receiving user input selecting a selectable tile element 500 provided within a newsfeed interface 502 illustrated in FIG. 5. Additionally or alternatively, a subsequent user interface may be displayed based on user input received via media consumption interface 222, such as watch list interface 700 depicted in FIG. 7, as will be explained in greater detail below in connection with step 130.

Transmission module 216 may transmit preview segment 218 to user device 204 in a variety of ways. In some examples, transmission module 216 may digitally stream preview segment 218 to user device 204 (e.g., via a continuous media transmission from server 202 to user device 204) via media consumption interface 222. Additionally or alternatively, transmission module 216 may enable user device 204 to digitally download preview segment 218 (e.g., via a download push button included within media consumption interface 222).

Transmission module 216 may transmit preview segment 218 in a variety of contexts. For example, in certain embodiments, media consumption interface 222 may represent an interface of media service 206 dedicated to providing recommended media (e.g., a "Recommended Videos" interface that includes videos recommended for viewing). In these embodiments, transmission module 216 may be configured to transmit a series of preview segments of recommended media items to user device 204 to be presented as a continuous stream of recommended media within media consumption interface 222. Additionally or alternatively, media consumption interface 222 may include a list of selectable recommended media items, and transmission module 216 may be configured to transmit preview segment 218 in response to media consumption interface 222 receiving user input selecting the selectable element for recommended media item 220 from the list.

In examples in which media service 206 operates as part of social media platform 208, transmission module 216 may be configured to provide recommended media item 220 within a variety of social media platform 208's services. For example, transmission module 216 may be configured to provide recommended media item 220 within a story and/or newsfeed interface of social media platform 208. In some such examples, transmission module 216 may be configured to transmit both connected content (e.g., content created by other users with whom a user is connected, such as the user's contacts) and recommended (i.e., non-connected) content (e.g., interspersing the recommended content among the connected content within media consumption interface 222).

FIG. 6 illustrates a specific embodiment in which preview segment 218 is transmitted as a social media composition (i.e., post 600) within a digital story. In FIG. 6, recommended media item 220 may represent a music video selected for user 214, and the digital story may represent a recommended story, generated via media service 206, of new-release music videos in which each social media composition within the digital story includes a preview segment of a different new-release music video. FIG. 5 illustrates a newsfeed with a story section 504 that includes a tile (element 500) for the recommended story just described.

In some embodiments, transmission module 216 may transmit recommended media item 220 as part of providing a collection (e.g., a digital digest 223) of recommended media items 205. In one such example, transmission module 216 may be configured to automatically stream a preview segment of each recommended music item within the digital digest. In some embodiments, transmission module 216 may automatically chain the streams together (i.e., auto-advancing from one preview segment to the next as a continuous stream). Additionally or alternatively, transmission module 216 may advance from one preview segment to another in response to receiving user input.

As a specific example of a digital digest, in examples in which recommended media item 220 represents a digital music video, transmission module 216 may transmit preview segment 218 as part of providing a digital digest of music videos selected for user 214. FIG. 4 provides an illustration of an exemplary embodiment in which preview segment 218 represents a preview segment provided as part of a digest (i.e., a "New Releases" digest depicted in FIG. 3).

As another specific example, in examples in which recommended media item 220 represents a recording of a lecture, transmission module 216 may transmit preview segment 218 as part of providing a digital catalog of lectures (e.g., as part of a digital education service). As another example, in examples in which recommended media item 220 represents a film, transmission module 216 may transmit preview segment 218 as part of providing a list of films recommended for streaming (e.g., in connection with a digital film-streaming service). As yet another example, in examples in which recommended media item 220 represents a podcast, transmission module 216 may transmit preview segment 218 as part of providing a digital digest of podcasts (e.g., in connection with a podcast streaming service).

Prior to transmitting preview segment 218, transmission module 216 may receive recommended media item 220 from a selection module 226 configured to select recommended media item 220 and/or preview segment 218. Selection module 226 may select recommended media item 220 and/or preview segment 218 based on a variety of factors and in a variety of ways. Each of these will be discussed in turn.

First, selection module 226 may select recommended media item 220 based on a variety of factors. In some examples, selection module 226 may select recommended media item 220 based on global (e.g., general) factors that are not specific to user 214. For example, selection module 226 may select recommended media item 220 based on a recency metric (e.g., related to the release date of the media item). As a specific example, in examples in which recommended media item 220 is provided as part of a "New Releases" music video digest, selection module 226 may select recommended media item 220 in response to determining that recommended media item 220 was released within a designated time period (e.g., within the past week).

As another example, selection module 226 may select recommended media item 220 based on a popularity metric (e.g., in response to determining that a popularity metric of recommended media item 220 satisfies a popularity threshold). Examples of popularity metrics include, without limitation, a number of user views logged for a media item within a specified time range, a number of digital user responses logged for the media item within a specified time range (e.g., a number of emoji-based responses, a number of comments, a number of shares, a number of reply stories, etc.), and/or a number of positive user responses logged for the media item within a specified time range (e.g., a number of emoji-based responses designated as positive, such as a heart emoji and/or a thumbs-up emoji, a number of comments determined to be positive via a natural language processing system, etc.).

In a related example, selection module 226 may select recommended media item 220 based on a determination that recommended media item 220 is similar to another media item with a popularity metric that satisfies the popularity threshold. This similarity determination may be based on a comparison of a variety of features, such as an artist involved in the creation of the media items, a subject matter of the media items, content identified within the media items (e.g., the use of particular words and/or phrases), a genre of the media items, and/or—in examples in which recommended media item 220 includes music—a musical quality of the media items (e.g., a beat, a tempo, etc.).

As another example of a global factor, selection module 226 may select recommended media item 220 based on a digital response collected from an additional user who viewed recommended media item 220 and/or preview segment 218. In these examples, prior to presenting preview segment 218 of recommended media item 220 to user 214, transmission module 216 may have (1) presented preview segment 218 and/or recommended media item 220 to an additional user and (2) identified a digital user response to preview segment 218 and/or recommended media item 220. Transmission module 216 may identify a variety of types of user responses, such as those described below in connection with steps 120 and 130.

In addition, or as an alternative, to selecting recommended media item 220 based on global factors, selection module 226 may select recommended media item 220 based on one or more factors that are specific to user 214 (i.e., personalized factors). Such factors may include, for example, a user demographic (e.g., age, ethnicity, residence, and/or occupation) and/or a digital social group to which user 214 belongs. Other examples of such factors may include user 214's digital media-consumption history (e.g., media items watched, digitally responded to, and/or shared) and/or digital media-follow history (e.g., groups, artists, media themes, and/or institutions followed by user 214). As a specific example, in examples in which recommended media item 220 represents a music video, selection module 226 may select recommended media item 220 based on other music videos user 214 has consumed (e.g., in response to determining that recommended media item 220 is similar to one or more of the previously consumed music videos based on a feature comparison) and/or based on an artist that user 214 follows (e.g., in response to determining that recommended media item 220 is produced by the artist and/or an additional artist determined to be similar to the followed artist based on a feature comparison).

In some examples, selection module 226 may select recommended media item 220 based on interests and/or digital actions of other users that match a profile of user 214 (e.g., a profile based on one or more of the personalized factors described above). For example, selection module 226 may select recommended media item 220 based at least in part on users with a similar profile having consumed and/or provided positive digital responses to recommended media item 220 and/or preview segment 218 (e.g., having added recommended media item 220 and/or preview segment 218 to a favorites list and/or digitally liked and/or shared recommended media item 220 and/or preview segment 218).

Additionally and/or alternatively, selection module 226 may select recommended media item 220 based on a previous response of user 214 to an additional preview segment (e.g., an additional preview segment that is determined to be similar to recommended media item 220 based on a feature comparison such as the feature comparison described previously). For example, selection module 226 may select recommended media item 220 based on a determination that user 214 had a positive reaction to the additional preview segment (e.g., accessed a full-length version of the additional preview segment, added the full-length version of the additional preview segment to a list, favorited the additional preview segment, etc.). As another example, selection module 226 may select recommended media item 220 based on a determination that user 214 had a negative reaction (e.g., skipped) the previous preview segment (e.g., based at least partially on a determination that recommended media item 220 is not similar to the previous preview segment).

In some embodiments, selection module 226 may select recommended media item 220 based on a contextual factor. For example, selection module 226 may select recommended media item 220 based on a time of day at which preview segment 218 is being presented (e.g., based on a determination that a type of media of interest to user 214 in the morning may be different than a type of media of interest to user 214 in the evening). As another example, selection module 226 may select recommended media item 220 based on a location of user device 204 (e.g., based on a determination that a type of media of interest to user 214 while at work is different than a type of media of interest to user 214 while at home) and/or a calendar event (e.g., a birthday, holiday, etc.).

Selection module 226 may select recommended media item 220 in a variety of ways. In some examples, selection module 226 may select recommended media item 220 manually, based on direct user input specifying recommended media item 220. For example, selection module 226 may select recommended media item 220 in response to user 214 having selected recommended media item 220 after initiating a digital media search. In other examples, selection module 226 may select recommended media item 220 automatically (e.g., based on one or more of the factors described above).

In some examples, selection module 226 may select recommended media item 220 based on an output 227 from a machine learning system 228. Machine learning system 228 generally refers to any type or form of computing system that is trained to automatically generate an output (e.g., a prediction) based on training data. In some examples, machine learning system 228 may represent an artificial neural network. Machine learning system 228 may generate the output relied on by selection module 226 based on a variety of inputs (e.g., input 229), such as the global and/or personalized factors described previously.

Second, selection module 226 may select preview segment 218 based on a variety of factors. Some factors may be global (that is, not specific to user 214). For example, selection module 226 may select preview segment 218 based on popularity data indicative of the aggregate previous interest of users in one or more segments of recommended media item 220 (e.g., after collecting such data). This popularity data may include, without limitation, (1) a number of digital responses posted to one or more segments of recommended media item 220 via a social media platform (e.g., emoji-responses, comments, reply stories, etc.), (2) watch data indicating user watch time of one or more segments of recommended media item 220, and/or (3) scrolling data indicative of one or more segments of recommended media item 220 that were skipped or replayed by other users.

In these examples, selection module 226 may select a preview segment from recommended media item 220 (e.g., preview segment 218) in response to (1) collecting popularity data for each of a variety of timestamps within recommended media item 220 and (2) determining, based on the popularity data collected for the timestamps associated with preview segment 218, that preview segment 218 is likely to be of interest (e.g., to be of greater interest relative to the segments associated with other timestamps). As a specific example, selection module 226 may select preview segment 218 in response to determining that (1) more than a threshold number of digital responses were submitted in association with preview segment 218, (2) user watch time of preview segment 218 exceeded a watch time threshold, and/or (3) preview segment 218 was replayed more than a threshold number of times. As another specific example, selection module 226 may select preview segment 218 in response to determining that preview segment 218 is the most popular of the various segments of recommended media item 220 (e.g., based on an evaluation of the popularity data for the timestamps of each segment).

In addition, or as an alternative, to selecting preview segment 218 based on global factors, selection module 226 may select preview segment 218 based on personalized factors specific to user 214, such as the personalized factors previously described. As a specific example of the use of personalized factors, selection module 226 may select a preview segment (i.e., preview segment 218) whose content type is "dance moves." In this example, selection module 226 may select a "dance moves" segment based on various personalized factors. For example, selection module 226 may select a "dance moves" segment based on demographic data (e.g., extracted from a profile maintained by social media platform 208), such as user 214's age, hometown, and/or occupation, in response to a determination that users with similar demographic data demonstrate a preference for preview segments that involve dance moves. Additionally or alternatively, selection module 226 may select a "dance moves" segment based on digital user history in media service 206 showing that user 214 has consumed similar "dance moves" preview segments (e.g., at above a threshold rate and/or number) and/or that a certain number of user 214's contacts provided positive digital responses to the "dance moves" segment (i.e., to preview segment 218). Additionally or alternatively, selection module 226 may select a "dance moves" segment based on user 214's follow history (e.g., based on a determination that user 214 follows one of the dancers featured in preview segment 218).

In some examples, selection module 226 may select preview segment 218 based on an output (e.g., output 227) from machine learning system 228. Machine learning system 228 may generate the output based on a variety of inputs, such as the global and/or personalized factors discussed previously.

Returning to FIG. 1, at step 120, one or more of the systems described herein may receive, from the device, an indication that the user has selected a user-selectable save element provided in association with the preview segment within the media consumption interface. For example, as illustrated in FIG. 2, a receiving module 230 may receive an indication 231 that user 214 has selected a save element 232 provided in association with preview segment 218 within media consumption interface 222.

Save element 232 generally represents an element that, when selected via user input, triggers a response module 234 to save a full-length version of recommended media item 220 to a container 236. User-selectable save element 232 may be digitally provided to user 214 in a variety of contexts. In some examples, user-selectable save element 232 may be presented within the same interface in which preview segment 218 is streamed (e.g., in a response portion of media consumption interface 222 located beneath the streaming section, as shown in FIG. 4). Additionally or alternatively, user-selectable save element 232 may be presented within a subsequent response interface provided after preview segment 218 is streamed within media consumption interface 222 (e.g., within a hover screen).

In one embodiment, user-selectable save element 232 may be provided in isolation. In other embodiments, as illustrated in FIG. 4, user-selectable save element 232 may be provided within a set of user-selectable elements 238, each of which may be associated with a different digital response to preview segment 218. In these embodiments, user-selectable elements 238 may include a variety of different user-selectable elements (e.g., in addition to user-selectable save element 232). For example, user-selectable elements 238 may include a watch-now element 240 that, when selected, triggers transmission module 216 to transmit (e.g., stream) a full-length version of recommended media item 220 within display element 224.

As another example, user-selectable elements 238 may include a skip element 242 that, when selected, triggers transmission module 216 to cease transmitting (e.g., streaming) preview segment 218 (e.g., and move on to streaming a preview segment of a subsequent recommended media item). As another example, user-selectable elements 238 may include a share element 244 that, when selected, triggers a sharing module to share preview segment 218 and/or a full-length version of recommended media item 220 via a social media channel available to user 214 (e.g., within a message of a messaging platform, a newsfeed post, and/or a digital story post). As another example, user-selectable elements 238 may include a replay element 246 that, when selected, triggers transmission module 216 to replay (e.g., re-stream) preview segment 218 within media consumption interface 222.

User-selectable elements 238 may take a variety of forms. In some examples, user-selectable elements 238 may take the form of selectable text (e.g., presented within a simple box as shown in FIG. 6). Additionally or alternatively, each of user-selectable elements 238 may be associated with a graphic (e.g., as shown in FIG. 4).

User-selectable save element 232 (e.g., as part of user-selectable elements 238) may be presented at various points in a media consumption flow directed at presenting preview segment 218 and/or recommended media item 220 (e.g., at the same time as preview segment 218 is streamed, subsequent to the streaming of preview segment 218, and/or after a threshold length of time that preview segment 218 has been streamed).

Indication 231 may represent any type or form of data, received from user device 204, that indicates a user selection 248 of a user-selectable element (e.g., user-selectable save element 232) via an input module 250 executing on user device 204. Input module 250 may receive user selection 248 in a variety of ways. For example, input module 250 may receive user selection 248 via tactile input to an auxiliary device, such as a keyboard and/or a digital mouse coupled to user device 204. As another example, input module 250 may receive user selection 248 via tactile input to a touchscreen of user device 204. In one embodiment, input module 250 may receive user selection 248 via auditory input processed by an auditory module of user device 204 and/or via gesture input processed by a gesture module of user device 204.

In some examples, input module 250 may, in addition or as an alternative to receiving user input selecting save element 232, receive user input selecting one or more additional user-selectable elements (e.g., an additional element from among user-selectable elements 238). In these examples, receiving module 230 may receive an indication that the user has selected the one or more additional user-selectable elements.

Returning to FIG. 1, at step 130, one or more of the systems described herein may add a full-length version of the recommended media item to a digital container maintained for the user. For example, as illustrated in FIG. 2, response module 234 may, in response to receiving module 230 receiving indication 231, add a full-length version of recommended media item 220 to container 236 maintained for user 214.

Container 236 may represent any type or form of digital storage structure that maintains recommended media items. In some examples, container 236 may represent a watch list dedicated to storing full-length versions of preview segments previously presented to user 214. In these examples, container 236 may enable a user consuming a preview segment of a media item to easily defer consumption of a corresponding full-length media item by enabling the user to add the full-length media item to container 236, for later consumption, after viewing the preview segment.

In one embodiment, container 236 may represent a favorites list, dedicated to storing recommended media items designated as favorites via user input. In certain embodiments, container 236 may represent a user-designated list (e.g., a collection of media items organized by user 214). As a specific example, user 214 may have created a "Summer Music" playlist for music videos that user 214 considers appropriate for the summer. In these embodiments, indication 231 may indicate a specific user-designated list selected via user input to which to add (i.e., save) the full-length version of recommended media item 220.

Figure 7:
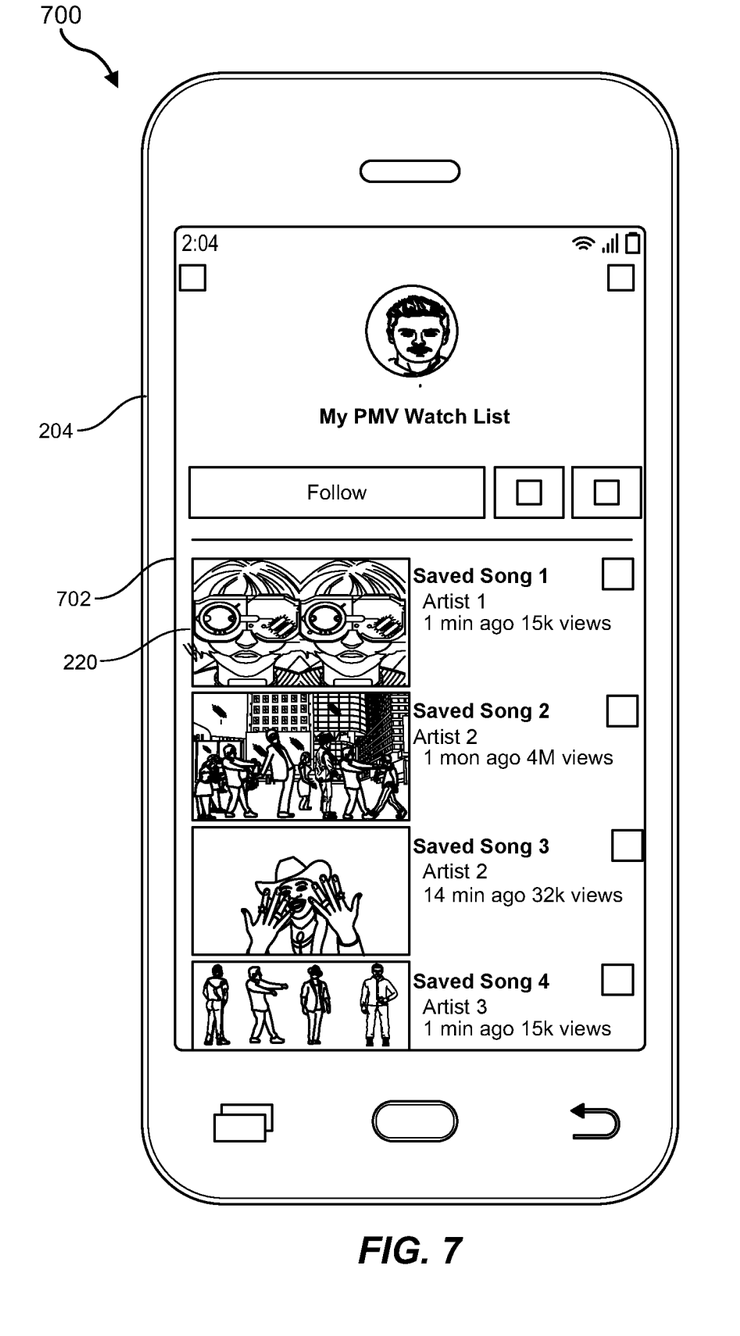
FIG. 7 is an illustration of an exemplary media consumption interface with a selectable watch list of media items, which may correspond to the preview streams of the selectable digital story depicted in FIG. 5.

After adding the full-length version of recommended media item 220 to container 236, response module 234 may make the full-length version of recommended media item 220 available to user 214 via an additional media consumption interface. FIG. 7 provides a specific example of an additional media consumption interface (i.e., watch-list interface 702) with a watch list that includes, as an entry, the full-length version of recommended media item 220. In this specific example, each entry within the list may be selectable and transmission module 216 may be configured to transmit the full-length version of recommended media item 220 (e.g., by streaming the full-length version of recommended media item 220 to watch-list interface 702) in response to an indication that the entry associated with recommended media item 220 has been selected via user input. In other examples, transmission module 216 may be configured to advance from one media item to the next automatically.

In examples in which receiving module 230 received an indication that user 214 had selected one or more other user-selectable elements (e.g., from among user-selectable elements 238), response module 234 may perform a corresponding digital action. For example, in embodiments in which user 214 selected watch-now element 240, response module 234 may cause transmission module 216 to stream a full-length version of recommended media item 220 within media consumption interface 222. As another example, in embodiments in which user 214 selected skip element 242, response module 234 may cause transmission module 216 to cease streaming preview segment 218 and/or may cause transmission module 216 to commence streaming a preview segment of a subsequent recommended media item.

As another example, in embodiments in which user 214 selected share element 244, response module 234 may post preview segment 218 and/or recommended media item 220 to a social media channel available to user 214 (e.g., within a newsfeed composition, story composition, and/or digital message). As another example, in embodiments in which user 214 selected replay element 246, response module 234 may cause transmission module 216 to re-stream preview segment 218 within media consumption interface 222.

In some examples, response module 234 may use user 214's digital response to preview segment 218 as an input to machine learning system 228. In these examples, machine learning system 228 may, based at least partially on the input, select a subsequent recommended media item and/or preview segment (e.g., for user 214).

As described throughout the instant disclosure, the present disclosure provides systems and methods for digital media transmission and storage. In one example, a computer-implemented method may include (1) transmitting a preview segment of a recommended media item to a user's device for presentation within a media consumption interface presented within a display element of the device, (2) receiving, from the device, an indication that the user has selected a user-selectable save element presented in association with the preview segment within the media consumption interface, and (3) in response to receiving the indication, adding a full-length version of the recommended media item to a digital container maintained for the user (e.g., a watch list that enables deferred media consumption of full-length media items).

In some examples, the media consumption interface may include a collection of user-selectable elements that includes the save element, a watch-now element that triggers the full-length version to be streamed within the media consumption interface, and/or a skip element that triggers the preview segment to cease streaming.

In one embodiment, the method may further include, prior to transmitting the preview segment to the device, selecting the preview segment and/or the recommended media item based on an output from a machine learning system. In this embodiment, (1) the method may also include (i) identifying a digital user response to an additional preview segment of an additional recommended media item, transmitted via the media consumption interface prior to the transmitting of the preview segment and (ii) applying the identified digital user response as an input to the machine learning system, and (2) the machine learning system may generate the output based at least in part on the input.

Additionally or alternatively, (1) the method may further include (i) collecting data indicative of previous user interest in one or more segments of the recommended media item (e.g., a number of digital responses posted to one or more segments of the recommended media item via a social media platform, watch data indicating user watch time of one or more segments of the recommended media item, and/or scrolling data indicative of one or more segments of the recommended media item that were skipped or replayed by other users) and (ii) applying the collected data as input to the machine learning system, and (2) the machine learning system may generate the output based at least in part on the input.

Additionally or alternatively, (1) the method may further include (i) collecting data relating to the user's media interests (e.g., a demographic of the user, a digital media-consumption history of the user, a digital media-follow history of the user, and/or a digital social group of the user) and (ii) applying the collected data as input to the machine learning system, and (2) the machine learning system may generate the output based at least in part on the input.

In some examples, the recommended media item may represent a recommended music video. In one such example, the method may further include providing a digital digest of recommended music videos selected for the user (e.g., a digest with multiple recommended music videos, including the recommended music video). In this example, (1) the method may additionally include automatically streaming a preview segment of each of the recommended music videos within the digital digest and (2) the preview segment of the recommended music video may be transmitted via streaming as part of automatically streaming the preview segment of each of the recommended music videos within the digital digest. In some examples, the digital digest of recommended music videos may represent a digest of recently released music videos, each of which corresponds to a music video that satisfies a recency metric.

In some embodiments, the recommended media item may represent an audio recording (e.g., a podcast and/or an audiobook) and/or a video recording (e.g., a film, a recording of an event, and/or a recording of a lecture). In one example, the media consumption interface may represent an ephemeral digital stories interface maintained within a stories framework of a social media platform.

In one embodiment, a system for implementing the above-described method may include (1) a transmission module, stored in memory, that transmits a preview segment of a recommended media item to a user's device for presentation within a media consumption interface presented within a display element of the device, (2) a receiving module, stored in memory, that receives, from the device, an indication that the user has selected a user-selectable save element provided in association with the preview segment within the media consumption interface, (3) a response module, stored in memory, that, in response to the receiving module receiving the indication, adds a full-length version of the recommended media item to a digital container maintained for the user, and (4) at least one physical processor configured to execute the transmission module, the receiving module, and the response module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) transmit a preview segment of a recommended media item to a user's device for presentation within a media consumption interface presented within a display element of the device, (2) receive, from the device, an indication that the user has selected a user-selectable save element presented in association with the preview segment within the media consumption interface, and (3) in response to receiving the indication, add a full-length version of the recommended media item to a digital container maintained for the user.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device" generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an", as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   transmitting, to a user's device for presentation within a media consumption interface provided via a social media application installed on the device, a digital digest of recommended music videos, the digital digest comprising a stream of preview segments of recommended music videos selected for the user, wherein the media consumption interface is configured to (1) auto-advance between each preview segment of the stream and (2) present, in association with each preview segment of the stream, one or more user-selectable elements for responding to the preview segment, the one or more user-selectable elements comprising a user-selectable save element;
   receiving, from the device, an indication that the user has selected the user-selectable save element presented in association with a certain preview segment of the stream; and
   in response to receiving the indication, adding, to a digital container maintained for the user, a full-length version of a recommended music video corresponding to the certain preview segment.

2. The computer-implemented method of claim 1, wherein the digital container comprises a watch list that enables deferred media consumption of full-length media items.

3. The computer-implemented method of claim 1, wherein the one or more user-selectable elements further comprise at least one of:
   a watch-now element that triggers a full-length version of a preview segment to be streamed within the digest interface; or
   a skip element that triggers a preview segment to cease streaming.

4. The computer-implemented method of claim 1, further comprising, prior to transmitting the digital digest to the device, selecting, based on an output from a machine learning system, at least one of a preview segment of the stream or a recommended media item corresponding to a preview segment of the stream.

5. The computer-implemented method of claim 4, further comprising:
   identifying a digital user response to an additional certain preview segment of a recommended media item, transmitted via the media consumption interface prior to the transmitting of the certain preview segment; and
   applying the identified digital user response as an input to the machine learning system, wherein the machine learning system generates the output based at least in part on the input.

6. The computer-implemented method of claim 4, further comprising:
   collecting data indicative of previous user interest in one or more segments of the recommended music video corresponding to the certain preview segment, the collected data comprising at least one of:
   a number of digital responses posted to one or more segments of the recommended music video via a social media platform corresponding to the social media application;
   watch data indicating user watch time of one or more segments of the recommended music video; or
   scrolling data indicative of one or more segments of the recommended music video that were skipped or replayed by other users; and
   applying the collected data as input to the machine learning system, wherein the machine learning system generates the output based at least in part on the input.

7. The computer-implemented method of claim 4, further comprising:
   collecting data relating to the user's media interests, the data comprising at least one of:
   a demographic of the user;
   a digital media-consumption history of the user;
   a digital media-follow history of the user; or
   a digital social group of the user; and
   applying the collected data as input to the machine learning system, wherein the machine learning system generates the output based at least in part on the input.

8. The computer-implemented method of claim 1, wherein the media consumption interface comprises a digest interface.

9. The computer-implemented method of claim 1, wherein the media consumption interface comprises an ephemeral digital story interface maintained within a stories framework of a social media platform corresponding to the social media application.

10. The computer-implemented method of claim 9, wherein transmitting the digital digest of recommended music videos comprises transmitting a digital story of recommended music videos comprising the recommended music videos of the digital digest.

11. The computer-implemented method of claim 1, wherein the digital digest comprises a digest of recently released music videos, each of which corresponds to a music video that satisfies a recency metric.

12. The computer-implemented method of claim 1, wherein:

prior to transmitting the certain preview segment, the certain preview segment was selected based on a content type of the certain preview segment; and the content type was selected for the user based on a determination that the user is interested in the content type.

13. The computer-implemented method of claim 12, wherein the content type comprises a dance-moves content type.

14. The computer-implemented method of claim 1, wherein the media consumption interface is configured to present the one or more user-selectable elements at the same time as each preview segment of the stream is streamed.

15. The computer-implemented method of claim 1, wherein the media consumption interface is configured to present the one or more user-selectable elements at least one of (1) subsequent to the streaming of each preview segment of the stream or (2) after a threshold length of time that each preview segment has been streamed.

16. A system comprising:
a transmission module, stored in memory, that transmits, to a user's device for presentation within a media consumption interface provided via a social media application installed on the device, a digital digest of recommended music videos, the digital digest comprising a stream of preview segments of recommended music videos selected for the user, wherein the media consumption interface is configured to (1) auto-advance between each preview segment of the stream and (2) present, in association with each preview segment of the stream, one or more user-selectable elements for responding to the preview segment, the one or more user-selectable elements comprising a user-selectable save element;

a receiving module, stored in memory, that receives, from the device, an indication that the user has selected the user-selectable save element presented in association with a certain preview segment of the stream;

a response module, stored in memory, that, in response to the receiving module receiving the indication, adds, to a digital container maintained for the user, a full-length version of a recommended music video corresponding to the certain preview segment; and at least one physical processor configured to execute the transmission module, the receiving module, and the response module.

17. The system of claim 16, wherein the one or more user-selectable elements further comprise at least one of:

a watch-now element that triggers a full-length version of a preview segment to be streamed within the digest interface; or a skip element that triggers a preview segment to cease streaming.

18. The system of claim 16, wherein a selection module selects at least one of a preview segment of the stream or a recommended media item corresponding to a preview segment of the stream based on an output from a machine learning system.

19. The system of claim 18, wherein the selection module further:
identifies a digital user response to an additional certain preview segment of a recommended media item, transmitted via the media consumption interface prior to the transmitting of the certain preview segment; and applies the identified digital user response as an input to the machine learning system, wherein the machine learning system generates the output based at least in part on the input.

20. A non-transitory computer-readable medium comprising one or more computer-readable instructions that, when executed by at least one processor of a computing device, cause the computing device to:
transmit, to a user's device for presentation within a media consumption interface provided via a social media application installed on the device, a digital digest of recommended music videos, the digital digest comprising a stream of preview segments of recommended music videos selected for the user, wherein the media consumption interface is configured to (1) auto-advance between each preview segment of the stream and (2) present, in association with each preview segment of the stream, one or more user-selectable elements for responding to the preview segment, the one or more user-selectable elements comprising a user-selectable save element;

receive, from the device, an indication that the user has selected the user-selectable save element presented in association with a certain preview segment of the stream; and in response to receiving the indication, add, to a digital container maintained for the user, a full-length version of a recommended music video corresponding to the certain preview segment.

* * * * *